(12) United States Patent
Edsinger

(10) Patent No.: US 10,800,505 B1
(45) Date of Patent: Oct. 13, 2020

(54) AUTONOMOUS AERIAL PERSONAL ASSISTANT DEVICE

(71) Applicant: X Development LLC, Mountain View, CA (US)

(72) Inventor: Aaron Ladd Edsinger, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 405 days.

(21) Appl. No.: 15/782,926

(22) Filed: Oct. 13, 2017

Related U.S. Application Data

(60) Provisional application No. 62/411,273, filed on Oct. 21, 2016.

(51) Int. Cl.
| | | |
|---|---|---|
| *B64B 1/40* | (2006.01) |
| *G10L 15/22* | (2006.01) |
| *H04N 7/15* | (2006.01) |
| *G05D 1/12* | (2006.01) |
| *H04L 29/06* | (2006.01) |
| *H04L 29/08* | (2006.01) |
| *H04W 4/80* | (2018.01) |

(52) U.S. Cl.
CPC ............... *B64B 1/40* (2013.01); *G05D 1/12* (2013.01); *G10L 15/22* (2013.01); *H04N 7/15* (2013.01); *G10L 2015/223* (2013.01); *H04L 67/104* (2013.01); *H04L 67/42* (2013.01); *H04W 4/80* (2018.02)

(58) Field of Classification Search
CPC .. B64B 1/40; G05D 1/12; G10L 15/22; G10L 2015/223; H04N 7/15; H04W 4/80; H04L 67/104; H04L 67/42
See application file for complete search history.

(56) References Cited

U.S. PATENT DOCUMENTS 9,471,059 B1 10/2016 Wilkins
10,360,265 B1 * 7/2019 Agarwal ............. G10L 15/1815
(Continued)

OTHER PUBLICATIONS

'www.dailymail.co.uk' [online] "Amazon patents an Alexa-powered drone assistant: UAV will be small enough to perch on your shoulder," Abigail Beall, Oct. 19, 2016, [retrieved on Jan. 8, 2018] retrieved from Internet: URL<http://www.dailymail.co.uk/sciencetech/article-3851342/Amazon-patents-Alexa-powered-drone-assistant-UAV-small-perch-shoulder.html> 6 pages.

*Primary Examiner* — Christian Chace
*Assistant Examiner* — Jordan S Fei
(74) *Attorney, Agent, or Firm* — Fish & Richardson P.C.

(57) ABSTRACT

Methods, systems, and apparatus, including computer programs encoded on a computer storage medium, relating to an autonomous aerial personal assistant device (AAPAD). The AAPAD can include a base unit housing various electronic components, a balloon for providing lift to carry a weight of the base unit, and a positioning unit that maintains a position of the balloon based at least on feedback provided by a plurality of sensors and computers. In some implementations, a request to initiate a communication session can be received on the AAPAD. Data indicating a presence of the user can then be obtained. A preset distance between the user and the AAPAD can be determined. Instructions to one or more components of the AAPAD can then be transmitted to automatically navigate the AAPAD to travel toward a location of the user.

14 Claims, 7 Drawing Sheets

(56) References Cited

U.S. PATENT DOCUMENTS

| | | | |
|---|---|---|---|
| 2011/0292348 A1* | 12/2011 | Tobita | B64B 1/28 353/28 |
| 2015/0280811 A1* | 10/2015 | Singhal | H04W 40/20 455/431 |
| 2017/0115218 A1* | 4/2017 | Huang | G01S 17/88 |
| 2018/0213186 A1* | 7/2018 | Chandra | G06K 9/6202 |
| 2018/0327070 A1* | 11/2018 | Rahnama | B64B 1/40 |

* cited by examiner

AUTONOMOUS AERIAL PERSONAL ASSISTANT DEVICE

CROSS REFERENCE TO RELATED APPLICATION

This application claims the benefit of U.S. Provisional Application No. 62/411,273, filed Oct. 21, 2016, the contents of which are incorporated by reference herein.

FIELD

This specification generally relates to electronic personal assistant devices, and more particularly to aerial floating devices that are capable of, e.g., autonomously navigating within an indoor location.

BACKGROUND

Personal assistant devices are electronic devices that can perform tasks or services for a user. Such tasks can be performed based on user input, location awareness, and the ability to access information from a variety of online sources, e.g., weather or traffic conditions, news, stock prices, and user schedules. Personal assistant devices function using a combination of mobile devices, application programming interfaces (APIs), and mobile applications that allow the user to perform tasks. A user can use a personal assistant device by providing voice instructions to either perform a one-time task, e.g., asking for directions to a nearby location, or ongoing tasks, e.g., schedule management.

SUMMARY

This specification generally describes systems, methods, devices, and other techniques for operating autonomous aerial personal assistant devices (AAPAD). In general, an AAPAD can include a base unit, a balloon affixed to the base unit, and a positioning unit. The base unit includes various electronic components that enable the device to automatically recognize and respond to user queries. The balloon provides lift for the device to float and aerially travel throughout an indoor location. The positioning unit assists the AAPAD to navigate toward designated locations and also maintains a designated aerial position based on feedback received from the components of base unit.

The structure and features of the AAPAD enable the device to carry out various tasks and operations relating to a user. Compared to traditional personal assistant devices or unmanned aerial devices (UAVs), which are often limited in their ability to perform specific tasks and functions, the AAPAD can adjust between capabilities based on the specific needs and/or circumstances of the user. For example, a user can use the AAPAD as a communication device to participate in communication sessions with a remote user, a personal assistant device for performing specified tasks and providing information, a navigational tool for identifying objects of interest within a property indoor location, or a monitoring device that monitors the conditions of an indoor location or users/objects located within the indoor location.

The AAPAD can be constructed to allow for high mobility. For instance, internal components within the base unit can be arranged symmetrically to provide an even distribution weight. The balloon can be used to lift the base unit to provide aerial capabilities such as floating. The positioning unit can include propulsion elements that apply forces in different directions enable the AAPAD to ascend or descend, move in a certain direction of travel, or remain within a designated aerial position. In addition, the AAPAD can include low power components, e.g., low voltage processors and sensors, in order to maximize travel time before recharging is necessary. The AAPAD can also be associated with a base station that recharges the battery of the base unit and refills gas that fills the balloon.

The AAPAD can operate in a substantially unobtrusive manner when interacting with a user. For example, the AAPAD can periodically monitor a user's activities and automatically determine when a user wants to interact with the AAPAD, e.g., when submitting a voice query with an instruction to perform an action. The AAPAD can also determine when a user wants privacy, e.g., when entering into the bathroom. The AAPAD can also dynamically adjust between different modes of operation based on user's current activities. In addition, the AAPAD can determine a preset distance that does not intrude on the user's sense of personal space. The AAPAD can then automatically maintain that distance during an interaction based on the user's comfort level.

The AAPAD can also operate autonomously without requiring any control by the user. For example, the AAPAD can periodically monitor the condition of the property and automatically determine when a user requires assistance or wants to perform an interactive action with the device, e.g., initiating a video conference. In another example, the AAPAD can automatically navigate to a charging station when its battery is low without requiring the user to manually charge the device.

In one general aspect, an autonomous aerial personal assistant device includes: a base unit includes one or more electronic components, and a rechargeable power generator that provides power to the one or more electronic components; a balloon for providing lift to carry a weight of the base unit; and a positioning unit that maintains a position of the balloon based at least on feedback provided by the one or more sensors and the one or more computers.

One or more implementations of the device may include the following optional features. For example, in some implementations, the one or more electronic components include: one or more display elements, one or more cameras, one or more microphones, one or more speakers, and one or more sensors; and one or more computers comprising a natural language processing element configured to process queries submitted by a user.

In some implementations, at least one of the one or more sensors is capable of generating a third-dimensional topological representation of a property region within a vicinity of the autonomous aerial personal assistant.

In some implementations, the one or more computers further comprise a user engagement element, the user engagement element configured to: operate in a first mode in which the autonomous aerial personal assistant remains in a designated location that is not viewable to a user; operate in a second mode in which the autonomous aerial personal assistant travels along a designated route that tracks movement of the user; or operate in a third mode in which the autonomous aerial personal assistant, upon receiving an instruction from the user, navigates towards a location of the user.

In some implementations, the user engagement element is configured to perform operations including: identifying a presence of a user within a vicinity of the autonomous aerial personal assistant device based at least on data obtained from the one or more cameras, the one or more sensors, and the one or more computers; determining a preset distance between the user and the autonomous aerial personal assistant device based at least on the presence of the user; and transmitting instructions to the positioning module to control movement of the balloon to maintain the preset distance between the user and the autonomous serial floating personal assistant.

In some implementation, transmitting instructions to the positioning module to control movement of the balloon to maintain the preset distance comprises transmitting instructions to the positioning module to control movement of the balloon such that the one or more display elements face the user during the movement of the balloon.

In some implementations, the user engagement element configured to perform further operations including: receiving data indicating a user-specified trajectory of movement; and transmitting instructions to the positioning module to control movement of the balloon to navigate towards the user-specified trajectory of movement.

In some implementations, the user engagement element is configured to perform operations including: receiving, from a user device, a request to initiate a communication session on the autonomous aerial personal assistant device; and in response to receiving a request to initiate a communication on the autonomous aerial personal assistant device, transmitting instructions to the positioning module to automatically navigate the autonomous aerial personal assistant device to travel toward a location of the user.

In some implementations, the user engagement element is configured to perform operations including: determining that a communication session with the user has ended; and in response to determining that the communication session with the user has ended, transmitting instructions to the positioning module to automatically navigate the autonomous aerial personal assistant device to travel in a direction away from a location of the user.

In some implementations, the one or more display elements include: a transmitting device for providing a display projection for output to a user; and a reflecting device for redirecting the display projection onto a surface of the balloon that is viewable to the user.

In some implementations, the balloon further includes a refillable helium tank configured to inflate the balloon with helium.

In some implementations, the one or more computers are configured to perform operations including: receiving, from a remote device associated with a first user, a request to initiate video conference with a second user near a vicinity of the autonomous aerial personal assistant; identifying a presence of the second user within the vicinity of the autonomous aerial personal assistant device based at least on data obtained from the one or more cameras, the one or more sensors, and the one or more computers; and in response to identifying the presence of the second user, transmitting instructions to the initiate the video conference between the first user and the second user.

In another general aspect, a computer-implemented method includes performing actions including: receiving, from a computer device of a user, data indicating a request to initiate a communication session on the autonomous aerial personal assistant device; obtaining data indicating a presence of the user within a vicinity of the autonomous aerial floating personal assistance device; determining an preset distance between the user and the autonomous aerial personal assistant device based at least on the obtained data indicating the presence of the user; and transmitting instructions to one or more components of the autonomous aerial floating personal assistance device to: (i) automatically navigate the autonomous aerial personal assistant device to travel toward a location of the user, and (ii) control movement of the autonomous aerial floating personal assistance device to maintain the optimal distance between the user and the autonomous serial floating personal assistant.

In some implementations, the method further includes performing the following actions: determining that the communication session with the user has ended; and in response to determining that the communication session with the user has ended, transmitting instructions to one or more components of the autonomous aerial personal assistant device to automatically navigate the autonomous aerial personal assistant device to travel in a direction away from a location of the user.

In some implementations, the method further including performing the following actions: transmitting instructions to the one or more components of the autonomous aerial floating personal operate in a particular mode from among multiple operation modes, the multiple operation modes including at least: a first mode in which the autonomous aerial personal assistant remains in a designated location that is not viewable to a user near a vicinity of the autonomous aerial personal assistant; a second mode in which the autonomous aerial personal assistant travels along a designated route that tracks movement of the user near the vicinity of the autonomous aerial personal assistant; and a third in which the autonomous aerial personal assistant, upon receiving an instruction from the user near the vicinity of the aerial floating personal assistance device, travels toward a location of the user.

In some implementations, the method further includes performing the following actions: receiving, from a remote device associated with a first user, a request to initiate video conference with a second user near a vicinity of the autonomous aerial personal assistant; identifying a presence of the second user within the vicinity of the autonomous aerial personal assistant device based at least on data obtained from one or more cameras, one or more sensors, and one or more computers; and in response to identifying the presence of the second user, transmitting instructions to the initiate the video conference between the first user and the second user.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1A:
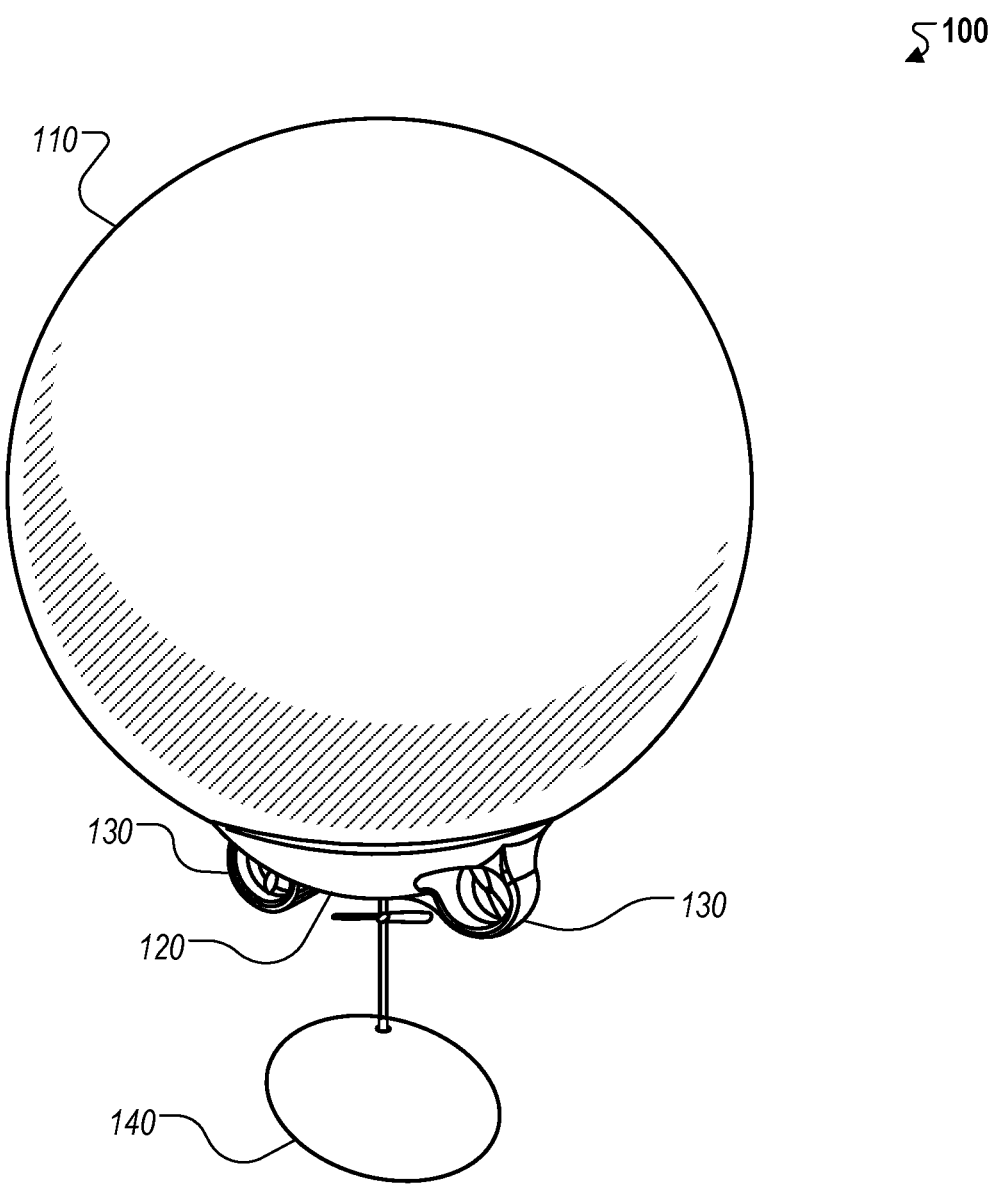
FIG. 1A illustrates an example of an AAPAD.

This specification generally describes, systems, methods, devices, and other techniques for operating an AAPAD. An AAPAD can include a base unit, a balloon affixed to the base unit, and a positioning unit. The base unit includes various electronic components that enable the device to automatically recognize and process a user's queries and perform different interactive operations. The balloon provides lift for the device to enable floating capabilities described in more detail below. The positioning unit maintains a position of the device based on feedback received from the components of base unit and enables the device to move throughout indoor locations of a residential property or a retail property.

As described throughout, the structural features and components of the AAPAD provide various advantages in operating as a personal assistant device relative to traditional personal assistant devices or unmanned aerial devices. For example, the floating capabilities of the AAPAD enable the device to easily maneuver around obstructions such as stairs or furniture without adjusting its movement patterns. This enables the AAPAD to quickly navigate between different locations without following certain tracks or routes. In another example, the AAPAD can operate autonomously from the user to perform a greater variety of tasks and operations whereas many personal assistant devices are either stationary, or require user input to initiate task performance. In addition, because the AAPAD uses a floating transport mechanism, the sound produced by its movement throughout a property is less than the sound produced by UAVs, which can often be intrusive for a user.

The AAPAD includes features that can be used to improve user engagement without being overly obtrusive. For example, the AAPAD can use various optical recognition techniques to identify times when a user requires assistance and times when a user requests privacy. The AAPAD can also automatically respond to specified user actions performed by the user. For example, if a user looks away and starts waking away from the AAPAD, then the device can determine that the user no longer wants to participate in an interactive session. In another example, an AAPAD can navigate towards the user in response to detecting specific verbal cues.

The AAPAD can also adjust between different modes of operation based on the actions of the user. For example, if a user's actions indicate that she wants an interactive experience, e.g., submitting instructions to perform a task, requesting assistance, the AAPAD can operate in a monitoring mode where the device automatically tracks and follows the user as she is performing a particular action. In another example, if the user actions indicate that she wants privacy, e.g., looking away from the device, providing instructions to leave, the AAPAD can instead operate in an inactive mode where the device retreats to a location that is less obtrusive to the user, e.g., a ceiling corner of a room. In this mode, the AAPAD can still monitor the user without being intrusive.

FIG. 1A is diagram that illustrates an example of an AAPAD 100. The AAPAD 100 includes a balloon 110 affixed to a base unit 120, one or more positional units 130, and tether component 140. Generally, the structural features of the AAPAD 100 enables the device to move throughout a property by aerially floating between designated locations. For instance, the balloon 110 can be filled to a volume sufficient to provide lift for a weight of the base unit 120, and the positioning unit 130 can include propulsion systems to apply thrust forces to move the AAPAD 100 in specific directions, and maintain the device in a designated position. As an example, if a user is participating in a video conference on the AAPAD 100, the positioning system can apply forces in different directions to maintain a stationary position of the device.

In the example of FIG. 1A, the balloon 110 can be filled with a gas that is less dense than air such as helium, nitrous oxide, or oxygen. The volume of the balloon 110 is sufficient such that it provides full or partial lift for a weight of the entire device. For example, the balloon 110 may provide full lift for the device until its volume depletes, and then the positon units 130 can support the remaining weight unable to be supported by the depleted balloon 110. The balloon 110 can also be associated with a gas charging station that periodically re-fills the helium within the balloon 110 when the air pressure starts depleting after device operation. In some implementations, the balloon 110 may include a small canister of highly compressed helium to either temporarily self-refill and/or adjust the ballast of the balloon prior to gas recharging.

The balloon 110 can be constructed using flexible materials such as aluminized nylon fabric (e.g., Mylar), rubber, latex, or polychloroprene. In some implementations, the balloon 110 is constructed with custom films with nanocoatings that are optimized to minimize gas leakage. In such implementations, the balloon 110 may stay afloat for extended periods of time (e.g., months) without having to recharge due to limited gas leakage. In addition, the material of the balloon 110 can allow expansion and/or deflation so that the volume of the balloon 110 can be dynamically adjusted based on the specific operation performed by the AAPAD 100. For example, when the AAPAD 100 operates in the inactive mode as described above, the volume of the balloon 110 can be expanded to enable the AAPAD 100 to float higher toward a ceiling while consuming less energy to maintain the device at this height.

In some implementations, the material of the balloon 110 is translucent to allow for the passage of light produced by a light source inside the balloon. For instance, the balloon 110 may include an array of light sources, e.g., light emitting diodes, that are capable of producing light to be displayed on the outer surface of the balloon 110. As an example, different light colors can be displayed on the outer surface of the balloon 110 to indicate modes of operation. In another example, light displayed on the outer surface of the balloon 110 can be used for providing the user with indicators, or providing signals to improve interaction. In yet another example, media content such as pictures or videos can also be projected onto the outer surface of the balloon 110.

In some implementations, the material of the balloon 110 is not entirely translucent, but includes an optical window on a portion of the surface of balloon 110 where a display can be provided for output to a user. For example, the optical window may display a projection of light from a light source outside of the balloon 110 onto the portion of the surface of the balloon 110 corresponding to the optical window. In other examples, the optical window can be mounted with different types of display screens such as organic light-emitting diodes (OLEDs), electronic ink (e-ink) displays, among others.

In some implementations, the balloon 110 can be a vacuum balloon that contains no gas. In such implementations, the materials used to construct the balloon 110 are light enough to support a vacuum without collapsing in on itself due to the atmospheric pressure.

The base unit 120 houses electronic components that enable the operation of the AAPAD 100. For example, the base unit 120 can include one or more display elements, cameras, microphones, speakers, sensors, and/or computers. The base unit 120 also includes a rechargeable power generator that provides power to the electronic components. The electronic components housed within the base unit 120 can be connected through multiple electronic circuits to enable the exchange of data between components in a manner similar to that of a computing device. For example, the base unit 120 may have one or more processors, and a storage medium with stored instructions that cause designated operations to be performed by each of the components. Each of the different components housed within the base unit 120 are discussed in greater detail in FIG. 1B.

The positional unit 130 generally enables the AAPAD 100 to move in a specified direction towards or away from points of interest. The positional unit 130 also enables the AAPAD 100 to maintain a designated position, e.g., a designated height from the ground, or a designated location within the property, in substantially stationary manner while consuming minimal energy. For example, the positional unit 130 may include one or more propulsion devices that are capable of providing forces in specific directions to control the movement of the AAPAD 100. The propulsion devices can adjust the direction and/or magnitude of propulsion force applied to allow for balancing or different types of movement. In some instances, the propulsion forces are applied to as counterbalancing forces to allow the AAPAD 100 to retain a stationary position without substantial movement. In other instances, the propulsion forces are applied as directional forces to allow the AAPAD 110 to move along a specified direction. Propulsion forces applied in different spatial axis can be applied in a coordinated fashion to, for example, allow the AAPAD 100 to make navigate around a property.

In the example depicted in FIG. 1A, the positional unit 130 includes propellers as propulsion devices that blow air in certain directions to provide forces to control movement of the AAPAD 100. In other implementations, other types of propulsion devices can also be used. For example, the positional unit 130 can include multiple motorized mechanical wings, propulsive nozzles, among others.

The module 140 is an optional component that can be included in the AAPAD 100. In the example depicted the module 140 is affixed to the base unit 120 using a wire tether. The wire tether can be used to electrically connect components housed within the module 140 to a power station housed within the base station 120. Greater detail regarding the module 140 is provided below with respect to FIGS. 2A-2D.

Various implementations of the AAPAD 100 can include electronic components of the AAPAD 100 housed in different locations. For example, in some implementations, the base unit 120 is housed inside the balloon 110 to reduce the overall footprint of the AAPAD 100. In other implementations, some of the electronic components, e.g., display elements, can be housed inside the balloon while other components are housed inside the base unit 120 in order to improve the weight distribution of the AAPAD 100. In some other implementations, the electronic components of the AAPAD 100 are housed in a combination of the base unit 120 and the module 140. For example, the computers and sensors of the device can be housed within the base unit 120 whereas the display elements, speakers, microphones, and other human-robot interface (HRI) components are housed within the module 140. In such implementations, the user can use the module 140 as an interface to view displayed information or content, participate in a communication session with a remote user.

Figure 1B:
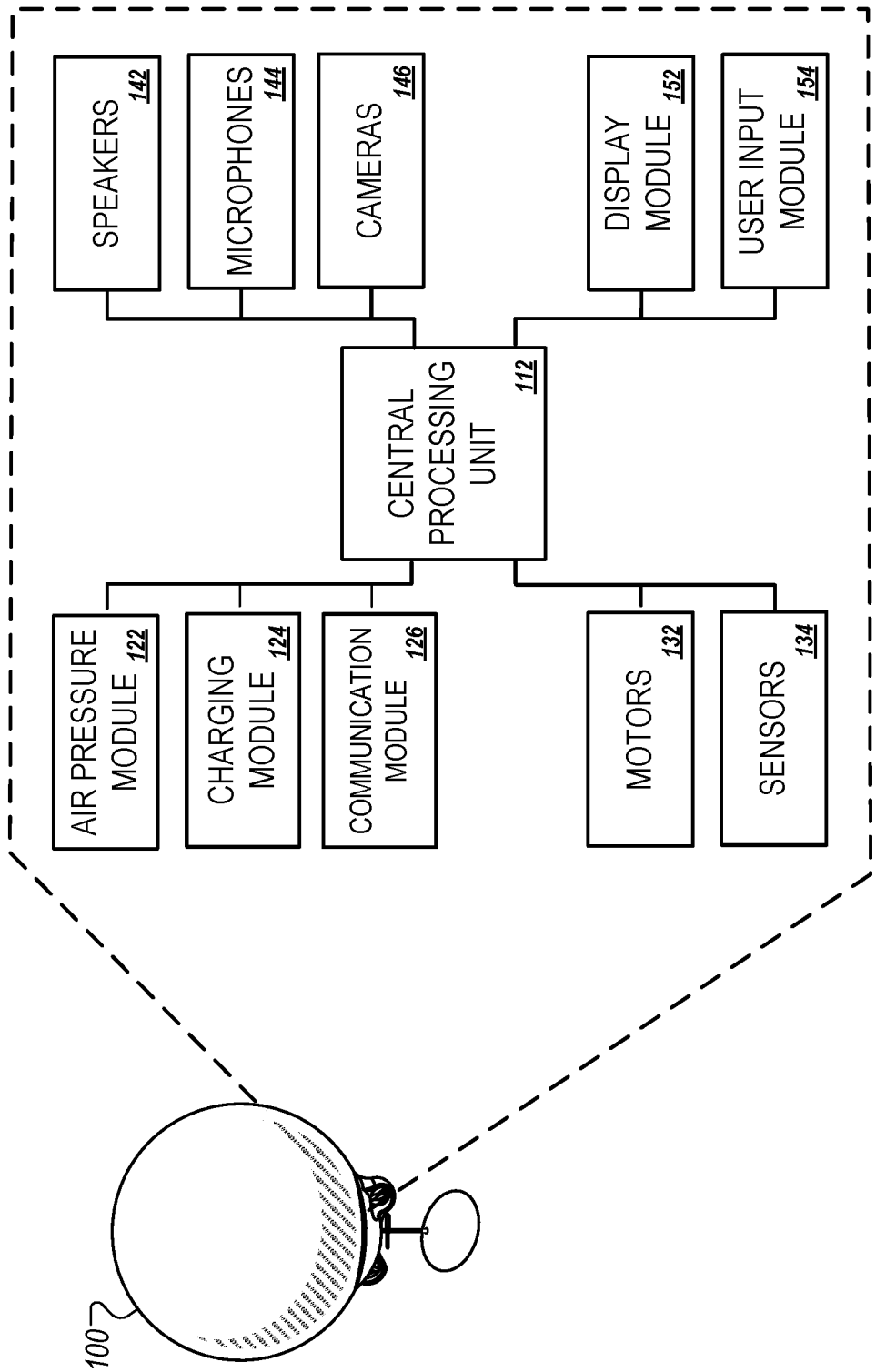
FIG. 1B illustrates examples of components of an AAPAD.

FIG. 1B is a diagram that illustrates examples of components housed inside the AAPAD 100. The components can include a central processing unit (CPU) 112, an air pressure module 122, a power module 124, a communication module 126, motors 132, sensors 134, speakers 142, microphones 144, cameras 146, a display module 142, and a user input module 144. In some implementations, the components depicted in the figure are modularized to allow customized device configurations.

The CPU 112 generally carries out the instructions of computer programs that specify operations performed by each of the components depicted in FIG. 2. For instance, the CPU 112 may perform basic arithmetic, logical, control, and input/output (I/O) operations specified by the instructions. The CPU 112 may include one or more microprocessors, memory, peripheral interfaces, and other integrated computer components that enable parallel processing of operations.

The CPU 112 can be configured to operate in various computing environments. For example, in some implementations, the CPU 112 performs all operations on-board within the AAPAD 100. In such implementations, the AAPAD 100 can be used as a standalone device without any additional electronic equipment. In other implementations, the CPU 112 can be configured to perform simple operations on-board, e.g., light control, battery monitoring), whereas other complex operations, e.g., user perception measurement, navigation, application runtime, can be performed remotely by another local electronic device such as a desktop computing device. In other implementations, the CPU 112 can be configured to operate over a wide area network (WAN) such as the Internet so that complex operations can be performed over a cloud computing network in order to conserve on-board power consumption of the AAPAD 100. In some instances, the CPU 112 can be capable of shifting between the different modes of operation to prioritize different tasks, e.g., shifting to on-board computing to reduce latency associated with task performance or shifting entirely to cloud-based computing to maximize device battery life.

The air pressure module 122 regulates the air pressure of the balloon 110. For instance, the air pressure module 122 can include a balloon filling tip gauge to control the inflow and outflow of gas into the balloon, a pressure gauge to measure the air pressure inside the balloon 122, and a regulator to periodically adjust the air pressure inside the balloon 122. In some instances, the air pressure module 122 can dynamically adjust the air pressure within the balloon 110 based on the mode of operation of AAPAD 100. For example, the air pressure module 122 may increase the air pressure within the balloon 110 when the device operates in the inactive mode in order to keep the device afloat at a higher distance with minimal power consumption by the positioning unit 130.

The air pressure module 122 can operate with a base station that automatically refills air inside the balloon 110 through the balloon filling tip gauge. For instance, the air pressure module 122 can periodically monitor the air pressure within the balloon 110, and in response to determining that the air pressure has dropped below a specified threshold, the air pressure module 122 can transmit a signal to the CPU 112 that the balloon 110 requires a refill. The CPU 112 can then transmit instructions to the positioning unit 130 to navigate towards the base station to refill the air through an air tank attached to the base station.

The power module 124 generally includes one or more rechargeable batteries that discharge power to the components of the AAPAD 100, and a charging port to recharge each of the batteries. The rechargeable batteries can be various types of lithium ion batteries such as lithium polymer batteries, lithium iron phosphate batteries, among others. Because of the operational requirements of the AAPAD 100, e.g., long battery and high safety environment, the rechargeable batteries can be configured with different chemistries to provide high discharging current, be non-explosive, and enable long cycle life. Other factors that can be adjusted are voltage, energy density, or working temperature of the batteries.

The power module 124 can operate within a base station that recharges batteries of the AAPAD 100. For example, as described above with respect to the air pressure module 122, the base station can include both an air refilling unit and a power charging unit. The power module 124 can monitor the battery life of the AAPAD 100 and in response to determining that the current battery level is below a predefined threshold, the power module 124 transmits a signal to the CPU 112 indicating that the device needs to be recharged. The CPU 112 can then transmit instructions to the positioning unit 130 to navigate towards the base station to refill the air through an air tank attached to the base station.

The communication module 126 can include various types of hardware that enable the AAPAD 100 to exchange wireless communications with nearby devices using different connection standards. For instance, the communication module 126 can include Bluetooth low energy (BLE) chips/beacons for detecting proximity of nearby wireless sensors. The communication module 126 also include Bluetooth sensors for exchanging wireless data communications, e.g., transmitting media files. In addition, the communication module 126 can also include one or more of a Wi-Fi chip, a nearfield communication (NFC) chip, an infrared (IR) sensor, or other types of hardware that enable comparable wireless communications.

The motors 132 can be electronic machines that convert electrical energy into mechanical energy in order to enable movement by the AAPAD 100. For example, the motors 132 can be used to generate energy for a propulsion system to provide thrust forces sufficient to either move the AAPAD 100 in a designated direction, or maintain the position of the device in a designated location. For example, the motors 132 can be used to produce both a thrust and torque about a device center of rotation, as well as a drag force opposite to the device's direction of flight.

In some implementations, the motors 132 can operate in different configurations to adjust the flight dynamics of the AAPAD 100. For instance, the motors 132 can be configured to provide movement along three degrees of freedom, e.g., up and down from a reference height, forward and backward along a specified path, or turning along the specified path. In addition, the motors 132 can be configured to provide forces to stabilize the device and prevent out of plane motion. The operation of the motors 132 can also be controlled based on user input received on the user input module 144, feedback received from the sensors 134, and/or instructions received from the CPU 112.

The sensors 134 can include different types of sensors that enable the AAPAD 100 to detect events or changes in its environment and provide corresponding outputs. For instance, the sensors 134 can include sensors related to movement such as a contact sensor, a pressure sensor, a motion sensor, an inertial measurement sensor, a gyroscope, an accelerometer, among others. The sensors 134 can also include different types of environmental sensors, such as a proximity sensor, a temperature sensor, a water sensor, a rain sensor, a wind sensor, a light sensor, a smoke detector, a carbon monoxide detector, an air quality sensor, etc. The sensors 134 can further include a health monitoring sensor, such as a prescription bottle sensor that monitors taking of prescriptions, a blood pressure sensor, a blood sugar sensor, etc. In some examples, the sensors 134 can include a radio-frequency identification (RFID) sensor that identifies a particular article that includes a pre-assigned RFID tag.

The data collected by the sensors 134 can be used provide feedback to one or more components of the AAPAD 100. As an example, data collected by the sensors 134 can used to construct a three-dimension topographical representation of a property. The topographical representation can include locations associated to points of interest, e.g., locations for placement of base stations for charging/refilling, locations of doors or windows, or designated retreat locations. The topographical representation can also be used to assist the AAPAD 100 to navigate throughout a property. For example, proximity sensors can be used to detect obstructions within a property, and adjust the movement of the AAPAD 100 to avoid the obstructions. In another example, data collected by the sensors 134 can be used to monitor the conditions of a property, and in response to detecting a potential emergency condition, the AAPAD 100 can respond to the detected emergency condition by automatically navigating to a location within the property associated with the detected emergency condition.

The speakers 142, microphones 144, and cameras 146 can be used to enable the AAPAD 100 to perform various media functions. For example, the speakers 142 enable the AAPAD 100 to output different types of audio, e.g., music playback, audible responses to user-submitted voice queries, among other types of output. The microphones 144 can be used to monitor environmental conditions of a property, receive and process audio data associated a user's voice queries, or record voice recordings. The cameras 146 can be used to capture images or video of a user, a property in which the AAPAD 100 is located, or objects within the property. For example, the cameras 146 can used to monitor objects within their field of view.

In some implementations, the AAPAD 100 may include multiple speakers 142, microphones 144, and the cameras 146 to provide special monitoring capabilities. For example, multiple cameras may be placed in a circular arrangement around the balloon 110 to enable the AAPAD 100 to capture a 360-degree field of view video. In other examples, the microphones 144 and/or the speakers 146 can be placed in similar arrangements to enable output along different sides of the AAPAD 100. In some implementations, operations of each of the multiple speakers 142, microphones 144, and cameras 146 can be selectively controlled based on the positioning of the AAPAD 100 within the property. For example, if one side of the AAPAD 100 is facing a wall, then the devices on this side may be periodically disabled to consume battery life while enabling the devices on the opposite side facing the user.

The display module 142 enables the AAPAD 100 to visually display information to the user. For instance, the display module 142 may include one or more display units placed in different regions of the device. In one example, a flexible display unit such as an organic light-emitting diode (OLED) screen be placed along a surface of the balloon 110 such that the user can view information directly on the surface of the balloon. In another example, a display device can be placed inside the module 140 while the balloon 110 floats above the user to enable the user to view information on the surface of the module 140. In some implementations, a combination of both examples may also be used.

The display module 142 can also include multiple multi-color light emitting diodes (LEDs) that adjust the color of the balloon 110 based on the particular action being performed by the AAPAD 100. Different colors can then be used to indicate signals to the user. For instance, the display module 142 may configure the LEDs to produce a white light when the AAPAD 100 is operating in an interaction mode where the device is exchanging voice communications with the user. In another instance, the display module 142 may configure the LEDs to produce a red light when the AAPD 100 detects an emergency condition within the property where the user may require assistance. In yet another instance, the display module 142 may configure the LEDs to produce a green light if the user has recently initiated a communication session with a remote user on the AAPAD 100.

In some implementations, the display module 142 includes a small-sized projector that provides a screen projection that is displayed on either a surface of the balloon 110 and/or the tethering module 140. For example, the projector can be arranged along a surface of the base unit and configured to project a screen towards a mirror that then reflects the projected screen onto the surface of the balloon 110 and/or the tethering module 140. In some instances, the projector position and/or the mirror position can be adjustable such that the location of the projected screen on the surface of the balloon 110 or the tethering module 140 can change based on the particular task performed by the AAPAD 100.

In some implementations, the display module 142 can include multiple display elements that are arranged in such a manner to minimize the rotational movement of the AAPAD 100 such that at least one display element is always facing a user. For example, the multiple display elements can be arranged on opposite surfaces of the balloon 110, e.g., two display elements 180 degrees apart from one another along the largest circumferential region of the balloon, or three display elements 120 degrees apart. In some instances, the display module 142 can selectively operate the multiple display elements to provide output only to one display element to conserve battery life. Alternatively, the display module 142 can also operate each of the multiple display elements simultaneously such that multiple users along different sides of the AAPAD 100 can view a single or multiple video feeds on the same device.

In some implementations, the display module 142 may additionally or alternatively include display elements of different types of display technologies. For example, the display module 142 can include an e-ink color display that is more power efficient compared to an LED or an OLED screen. In another example, display module 142 may further include one or more components that are capable of phosphorescence to generate an internal light from the balloon 110. The display module 142 can also include one or more switches or sliders that adjust the particular display technology currently being used by the AAPAD 100 based on the particular application or task being performed. For example, the display module 142 may use a high resolution display element when the user is using AAPAD 100 is being used for playback of a high definition video. Alternatively, the display element 142 may switch to using LED indicators to produce light from the balloon 110 when the user is using the AAPAD 100 as a navigational tool in the dark.

The user input module 144 can include various types of software that enables the AAPAD 100 to receive and process various types of input provided by a user. For instance, the user input module 144 can include an automated speech recognizer (ASR), and an associated language processing module for automatically recognizing voice queries submitted by a user. The user input module 144 may also enable touch input on one or more of the display elements viewable to the user to allow for the collection of various types of text queries submitted by the user.

In various implementations, the components of the AAPAD 100 can be configured run applicable software or firmware to provide different types of functions. In some implementations, the AAPAD 100 is capable of operating as a voice-enable search engine that provides responses to a user-submitted request for information. For example, the user input module 154 can be configured to receive audio data encoding a user utterance, and transmit the received audio data to an ASR to perform voice recognition and generate a transcription for the utterance. In this example, the communication module 126 can provide the transaction to a search engine, or any suitable information retrieval system, to obtain information that this responsive to the request represented by the transcription. The information is can be provided to the user through, for example, the speakers 142 as a voice response, through the display module 152 as a textual or visual response.

In some implementations, the AAPAD 100 is capable of determining or selecting an optimal output technique for providing a user with information that is responsive to a search query, e.g., the output technique that best represents the information requested by the user. For example, in response to receiving a voice query requesting information for a movie, the AAPAD 100 may display a video of a trailer for the movie on the display module 152. In another example, in response to receiving a voice query requesting information for a song, the AAPAD 110 may instead play an audio file representing the song through the speakers 142. In some instances, the determination of the optimal output technique can be based on query log data associated with the user, user profile data indicating user preferences and/or demographics, among other types of user-specific information.

In some implementations, the AAPAD 100 is capable of exchanging data communications with other electronic devices that are connected to a local area network of a property. For example, the AAPAD 100 can operate as a smart home device that allows the user to control the functions of the electronic devices by, for instance, providing voice commands. In this example, the AAPAD 100 can transmit commands to the electronic devices directly, e.g., using a Z-wave or Bluetooth connection, or through a control unit that transmits commands to the electronic devices, e.g., a smart home hub device. In some other examples, the AAPAD 100 can be capable of performing other types of smart home functions such as adjusting the thermostat temperature, turning on or turning off light sources, providing an instruction to a display device or a media playing device to stream a video or audio file, among others.

In some implementations, the AAPAD 100 may be capable of using spatial awareness, object recognition, and/or other types of sensing techniques to perform actions that are typically not performable by a stationary personal assistant device. For example, if a user provides the voice query "where are my keys?" the AAPAD 100 may navigate through the property and perform object recognition techniques on collected sensor data, e.g., captured images of the physical environment of the property, to identify a location of the user's keys within the property. In some instances, the AAPAD 100 may use device-to-device communications to locate objects or devices within the property. For example, if the user provides the voice query "where is my phone?" the AAPAD 100 may broadcast a signal as it navigates the property and identify a location within the property where the user's phone is located when the AAPAD 100 determines that the user's device has received the broadcasted signal and provided a signal response.

In some implementations, the AAPAD 100 can be used to verify the status and/or configuration of a device within a property without requiring the user to go to the location of the device within the property. For example, if the user goes to another room within the property while cooking food on a stove, then he/she can provide an instruction to the AAPAD 100 to collect a picture of the food and/or the stove and provide the collected picture on the display module 152 without the user having to return to the kitchen. In some instances, the AAPAD 100 can store a repository of known objects and their corresponding coordinate locations within the property, and access the repository to perform actions associated with the known objects. For example, if a user provides the instruction "check to see if the trash is full," the AAPAD 100 may navigate to a location of a trash can within the property, take a picture of it, and return to the user's location within the property to display the collected picture.

Figure 2A:
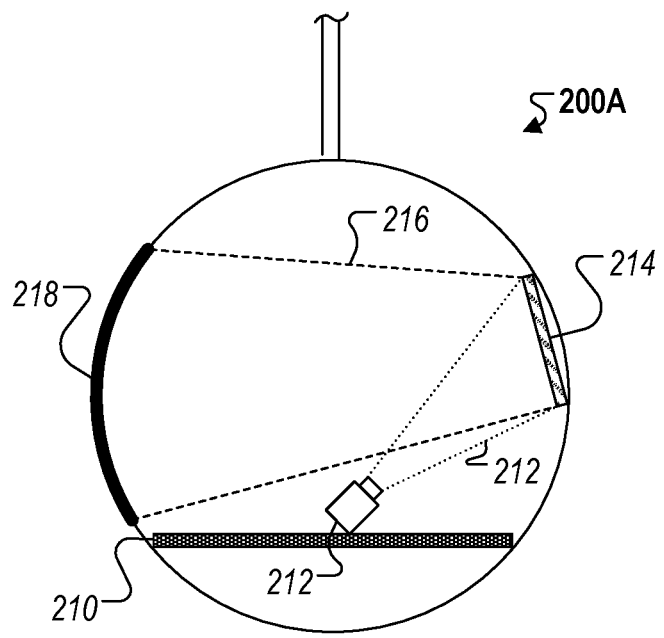
FIGS. 2A-2D illustrate examples of modules that can be attached to an AAPAD.
Figure 2B:
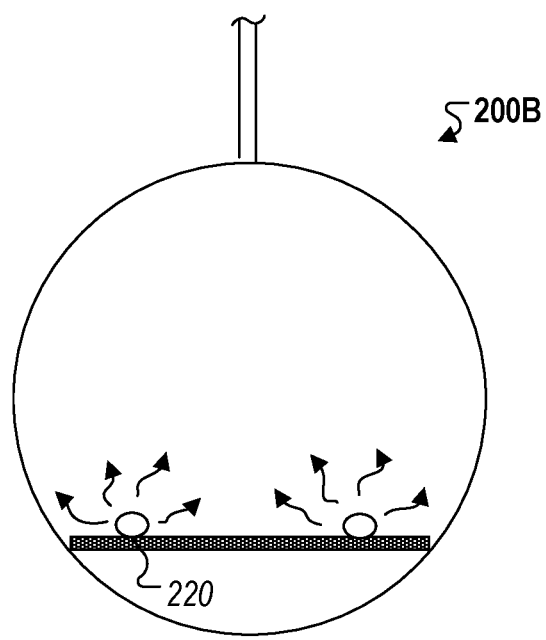
Figure 2C:
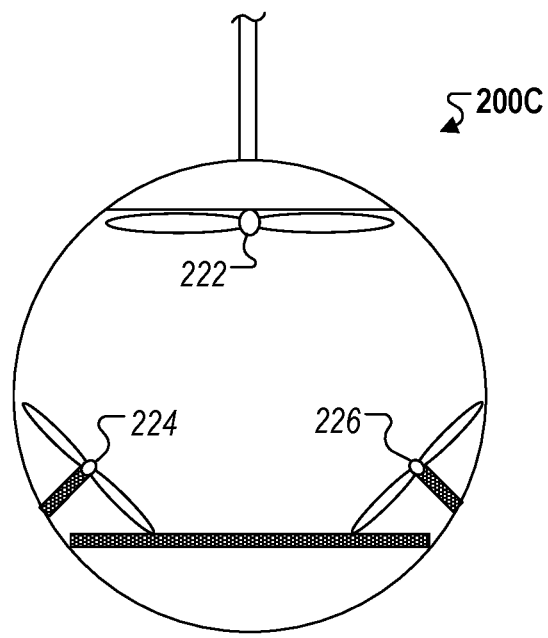
Figure 2D:
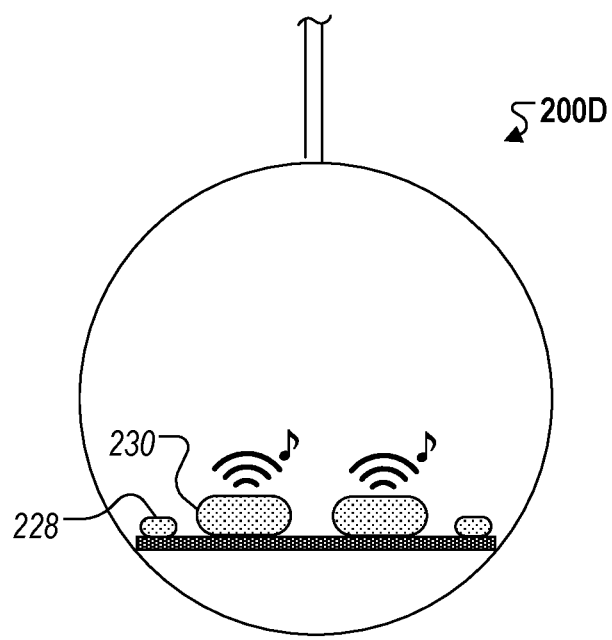

FIGS. 2A-2D illustrate examples of different implementations of the module 140 illustrated in FIG. 1A. FIG. 2A illustrates a module 200A that includes a projector for projecting a display screen onto a surface of the module 140. FIG. 2B illustrates a module 200B that includes LEDs for internally lighting the module 140. FIG. 2C illustrates a module 200C that includes internal propellers for providing internal propulsion to the module 140. FIG. 2D illustrates a module 200D that includes speakers and cameras within the module 140. Although the examples illustrated in FIGS. 2A-2D are described in the alternative for clarity, in some instances, the module 140 can multiple features from the different exemplary implementations illustrated in the figures.

In general, the module 140 can be attached to the balloon 110 or the base unit 120 of the AAPAD 100 using a wired tether as illustrated in FIG. 1A. In some implementations, the tether used to attach the module 140 can have an adjustable length such that the distance between the balloon 110 and the module 140 can vary based on the particular task performed by the AAPAD 100. As an example, when the AAPAD 100 operates in the inactive mode, the tether can be retracted so that the module 140 becomes attached to the balloon 110 to accompany the smallest amount of space. Alternatively, when operates in the interactive mode, the tether can be extended to specified length such that the module 140 is dispatched to a certain length below the balloon 110. In this example, the module 140 can display information to the user and/or provide other types of output, e.g., sound, instructions, etc.

In some implementations, the module 140 is a mobile robot that is configured to operate alongside the AAPAD 100 to coordinate and/or complete certain tasks or operations. For example, the AAPAD 100 can operate as a human-robot interface (HRI) that receives user inputs from a user to control operation of the mobile robot. In another example, the AAPAD 100 can operate one or more of its electronic components based on commands received from the mobile robot. In some instances, mobile robot 140 can be connected directly to the AAPAD 100 using the wired tether. Alternatively, the mobile robot 140 can also exchange wireless communications with the mobile robot.

The tether attached to the module 140 can be constructed with materials that can sufficiently sustain the weight of the module 140 over extended periods of time. In addition, in some instances, the outer surface of the tether may be coated with substances that reflect light such that the tether appears substantially invisible to the user when the module 140 is lowered from the balloon 110.

As described above with respect to FIG. 1A, the module 140 can be constructed with translucent material such that light generated internally can pass through the outer surface of the module 140 and appear visible to the user. For example, an internal LED within the module 140 can produce a color of light that is then transmitted through the outer surface to given the appearance that the module 140 is a certain color. In another example, images and/or graphical elements may be generated onto the surface of the module 140 for display to the user.

Referring initially to FIG. 2A, the module 200A generally includes a base 210, a projector device 212, and a mirror 214. The base 210 can be a printed circuit board (PCB) that electrically connects components within the module 200A and mechanically supports the components using pads, conductive tracks, and/or other features etched from conductive material laminated onto non-conductive substrates.

The projector 212 is placed at an angle on the base 212 such that a projected video or image follows a light path 212 that reflects off the surface of the mirror 214. The reflected light then follows a light path 216 and is finally projected onto a surface portion 218 of a surface of the module 200A. In this regard, images and/or videos outputted from the projector 212 can be displayed directly on the other surface of the module 200A. This technique can be used to provide users with visual information directly on the surface of the module 200A.

In some implementations, a user can interact with the surface portion 218 in order to provide user input in relation to visual information that is displayed. For example, the surface portion 218 may include capacitive or pressure resistive sensors that are configured to detect touch input provided by user. A user can then use the surface portion 218 in a manner similar to that of conventional touch interfaces of a touch-enabled electronic device such as a smart phone.

Referring now to FIG. 2B, the module 200B includes one or more LEDs 220 placed on the base 210. As described above, the LEDs 220 may produce light that is then transmitted through the surface of the module 200B. The LEDs 220 may be arranged in a manner to evenly transmit light through each of the sides of the module 200B. In one example, the LEDs 220 are placed in a concentric ring arrangement around an axis of the tether. In addition, the LEDs 220 can be multi-color LEDs 220 such that the visible color of the module 200B can be adjusted based on the particular task performed by the AAPAD 100.

Referring now to FIG. 2C, the module 200C includes propellers 222, 224, and 226 to control the movement of the module 200C. For instance, the propellers 222 can be used to generate positive buoyancy to provide lift for the module 200C, whereas the propellers 224 and 226 can be used to control the aerial position of the module 200C. In addition, the propellers 222, 224, and 224 can be placed in a particular arrangement within the module 200C to provide thrust forces to maintain the position of the module 200C. For instance, the propellers can be arranged in a circle 120 degrees apart to provide thrust forces in three directions along a horizontal axis of the module 200C. In the example depicted, In some instances, the propellers 222, 224, and 226 can be used to provide lift for the module 200C in addition to lift provided by the balloon 110. For example, the propellers 222, 224, and 226 can be used to reduce the total weight of the AAPAD 100 to be lifted by the balloon 110. In another example, the balloon 110 can be used to maintain a baseline lift for the AAPAD 100 whereas the propellers 222, 224, and 226 can be used to increase or decrease the altitude of the module 200C relative to the balloon 110.

Referring now to FIG. 2D, the module 200D includes cameras 228 and speakers 230. For instance, the cameras 228 can be used to enable various video capabilities, e.g., allowing a user to initiate a video conference through the module 200C, collecting security video footage of the property, and/or monitoring a user within a property. In some examples, the cameras 228 are miniaturized smart phone cameras that are capable of using optical recognition techniques for identifying objects of interest within a field of view. In other examples, the cameras 228 are equipped with scanning capabilities that enable the mapping of a property to identify obstructions or points of interest. In these examples, video data collected by the cameras 228 can be used to enable the AAPAD 100 to autonomously navigate through a property.

The speakers 230 can be used to provide sound output relating to various capabilities, e.g., playing music files as a personal media device, providing audio output during a video conference, and/or providing responses to voice queries submitted by the user. In some examples, the speakers 230 can be miniaturized piezo cellphone speakers that are arranged to enable the module 200D to be used as an acoustic chamber.

Figure 3:
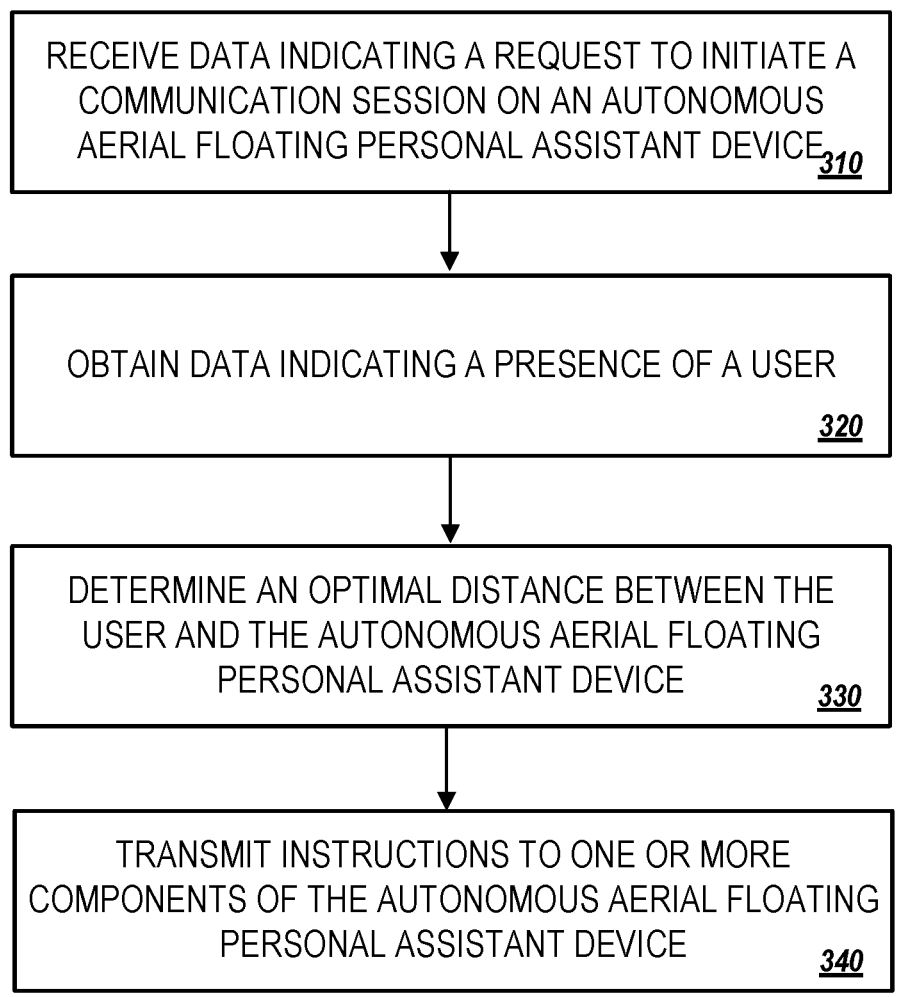
FIG. 3 illustrates an example of a process for automatically initiating a communication session between a user and an AAPAD.

FIG. 3 illustrates an example of a process 300 for automatically initiating a communication session between on an autonomous aerial personal assistant device. Briefly, the process 300 can include receiving data indicating a request to initiate a communication session (310), obtaining data indicating a presence of a user (320), determining a preset distance between the user and the autonomous aerial personal assistant device (330), and transmitting instructions to one or more components of the autonomous aerial personal assistant device (340).

In more detail, the process 300 can include receiving data indicating a request to initiate a communication session (310). For instance, the CPU 112 may receive a request to initiate a communication session on the AAPAD 100 from a device. In some instances, the request is received from a mobile electronic device of the user, e.g., a smart phone, tablet computer, or a notebook computer. In such instances, the user may use a mobile application associated with the AAPAD 100 to transmit the instruction. In other instances, the request is transmitted as a voice query submitted directly by the user, e.g., a user calling for assistance from the AAPAD 100. In other instances, the request is received over a network from an electronic device of a remote user.

The process 300 can include obtaining data indicating a presence of a user (320). For instance, the CPU 112 may obtain data from the sensors 124 indicating a presence of the user within a vicinity of the AAPAD 100. For example, data collected by cameras, proximity sensors, or microphones can be processed together to determine a presence of the user. In some implementations, the AAPAD 100 periodically navigates through a property to identify a last known location of the user. In response to receiving the request to initiate a communication, the AAPAD 100 may automatically navigate to the last known location to determine if the user is still in the same location or if the user has moved. In other implementations, a proximity beacon of the AAPAD 100 may identify a wireless signal transmitted from a wearable device of the user and identify a presence of the user based on the identified location of the wearable device.

The process 300 can include determining a preset distance between the user and the autonomous aerial personal assistant device (330). For instance, the CPU 112 may determine a preset distance between the user and the AAPAD 100 based at least on the presence of the user. As described above, the preset distance refers to a distance such that the AAPAD 100 provides an interactive yet unobtrusive experience for the user when the device operates in the interactive mode. In some instances, the preset distance can be based on individual preferences of the user. In other instances, the preset distance can additionally, or alternatively, based on historical information indicating a user's actions during prior communications or monitoring data of the user.

The process 300 can include transmitting instructions to one or more components of the autonomous aerial personal assistant device (340). For instance, the CPU 112 may transmit instructions to the positioning unit 130 to automatically navigate the AAPAD 100 to travel toward a location of the user indicated by the presence data. The transmitted instructions may also control movement of the AAPAD 100 to maintain the preset distance between the user and the AAPAD 100.

As described above, the structure and features of the AAPAD 100 enable the device to carry out various operations in relation to a user's action. Compared to traditional personal assistant devices or unmanned aerial devices, which are often limited in their ability to perform specific tasks and functions, the AAPAD 100 can adjust between multiple modes based on the specific needs and/or circumstances of the user. In one example, the AAPAD 100 can be used as a communication device that enables a local user to participate in a communication session with remote users using display elements shown on the AAPAD 100.

In another example, the AAPAD 100 can be as a personal assistant device that performs certain actions in response to receiving user voice queries. For instance, the personal assistant may provide users with visual or auditory information in response to a user's question. In other instances, the AAPAD 100 may automatically enable or disable network-enabled devices in a property in response to receiving user instructions to do so.

In another example, the AAPAD 100 can be used as a navigational tool that assists a user to move through a property in difficult situations. For instance, the AAPAD 100 can produce light using its display elements to assist the user to navigate a property in the dark. In other instances, the AAPAD 100 can be used in retail properties to assist consumers in finding products of interest. For example, using the voice recognition and language processing capabilities described above, the AAPAD 100 can identify a consumer's request for a product of interest and then automatically navigate to a location in the retail property where the product is stored based on a stored map with associated information.

In another example, the AAPAD 100 can be used as a monitoring device with various types of capabilities. For instance, the AAPAD 100 can periodically collect security video footage of a property to monitor the conditions of a property. In such instances, the AAPAD 100 can identify instances when there is a security breach within a property and automatically notify a user of the identified security breach. In other instances, the AAPAD 100 may monitor the activities of a user in order to determine when the user may require assistance. Using the techniques described above, the AAPAD 100 is capable of monitoring the user in an unobtrusive manner by maintaining a preset distance where the user does not feel that his/her personal space is being violated. In other instances, the AAPAD 100 can be used to monitor the condition of specified movable objects within a property. In such instances, because the AAPAD 100 is capable of navigating through a property, the AAPAD 100 can monitor where the specified object is location within the property and periodically collect data relating to the usage of the specified object.

Figure 4:
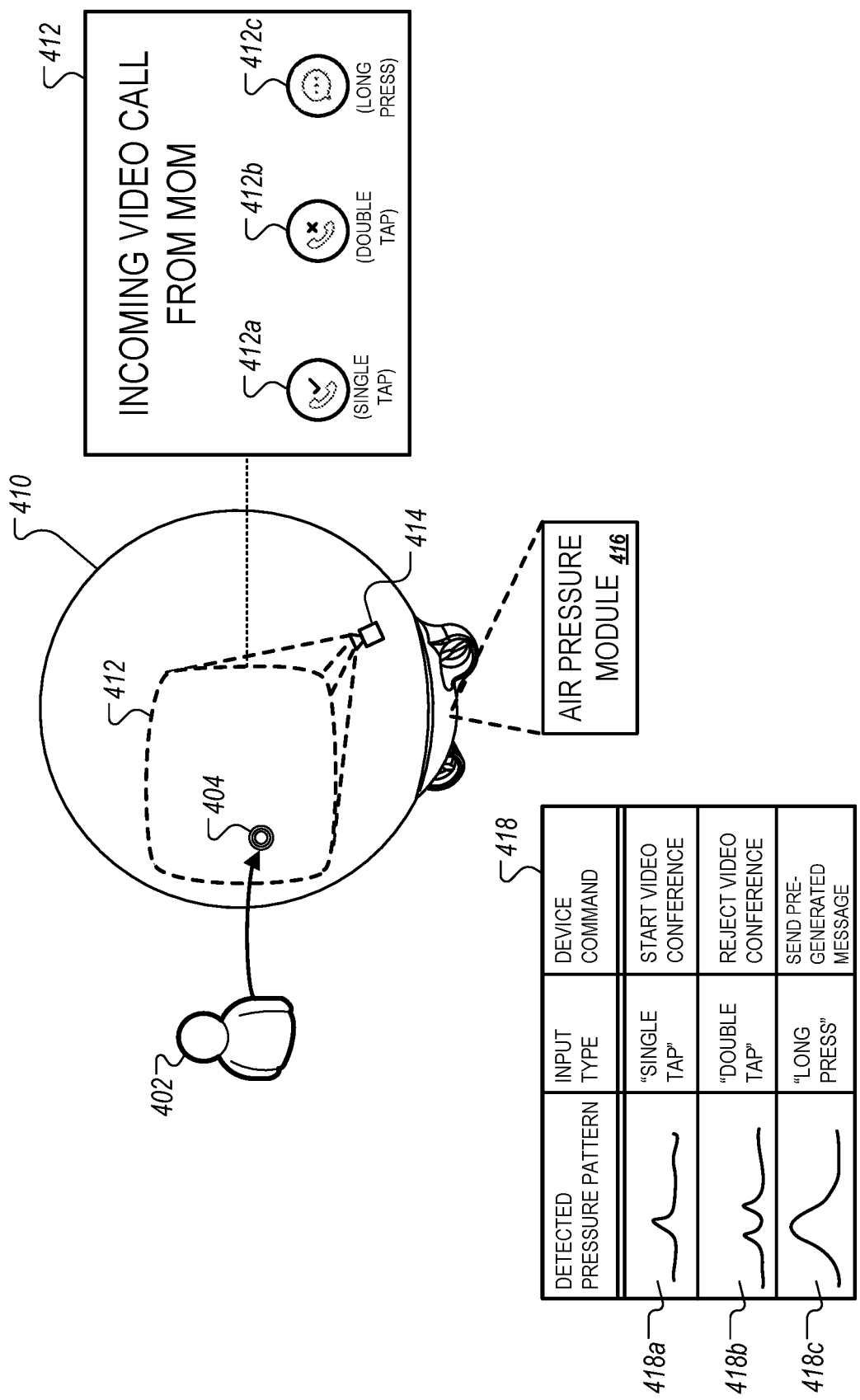
FIG. 4 illustrates an example of an AAPAD that is capable of detecting user input provided on a surface of the AAPAD.

FIG. 4 illustrates an example of an AAPAD 410 that is capable of detecting user input provided on a surface of the AAPAD 410. In the example, a projector 414 projects light onto a balloon surface of the AAPAD 410 to display a user interface 412 in a similar manner as discussed above for FIG. 2A. For example, the projector 414 may project a display screen onto the balloon surface using a light path that reflects off a surface of a mirror placed within the balloon of the AAPAD 410. In other examples, the projector 414 projects the display screen directly onto the balloon surface.

The interface 412 can be presented to a user 402 to illicit input 404 and perform device actions associated with information presented on the interface 412. In the example depicted in FIG. 4, the interface 412 presents an incoming video call from a known contact of the user 402, and options for responding to the incoming video call. In this example, the user 402 provides different types of input in association with the interface 412 to indicate different device commands to be executed by the AAPAD 410. In the example depicted, the input 404 can be a "single tap" touch gesture, a "double tap" touch gesture, or a "long press" touch gesture that the user 402 provides directly onto the surface of the balloon. In some instances, the input 404 is provided onto a portion of the surface that displays the interface 412 to improve interactivity as the user 402 interacts with the interface 412. In other instances, the AAPAD 410 can also recognize a submitted user input if the user 402 provides the input 404 onto a different region of the balloon surface that does not display the interface 412.

In the example depicted in FIG. 4, the AAPAD 410 recognizes the type of input provided by the user 402 based on changes in pressure within the balloon of the AAPAD 410 that are detected by an air pressure module 416. For example, the air pressure module 416 may monitor balloon pressure and use detected changes in pressure levels to identify pressure patterns, e.g., distinctive changes in pressure over a period of time, that coincide with certain types of input.

Three examples of pressure patterns are shown in FIG. 4. Pressure pattern 418a represents a small pressure increase resulting from the user 402 providing a single tap on the balloon surface. Pressure pattern 418b represents small pressure increases resulting from the user 402 providing two taps on the balloon surface. Pressure pattern 418c represents a large pressure increase resulting from the user 402 providing a single tap on the balloon surface for a longer time period. Each of the pressure patterns 418a-c are mapped to an input type, e.g., "single tap," "double tap," "long press," and a corresponding device command to be executed by the AAPAD 410, e.g., "start video conference," "reject video conference," "send pre-generated message." In this regard, the AAPAD 410 performs a particular device command specified within table 418 based on pressure changes detected by the air pressure module 416.

The air pressure module 416 can use various technique to reduce the likelihood of falsely identifying a user input based on a detected change in pressure that may, for example, not be associated with user input. The air pressure module 416 may be configured to selectively monitor pressure patterns during specified time periods when the AAPAD 410 is determined to be interacting with the user 402. For example, the air pressure module 416 may detect that the pressure pattern has occurred only when the interface 412 is being actively presented to the user 402. In this example, other types of pressure patterns that are attributed to, for example, physical interactions with obstructions in a property as the AAPAD 410 navigates through the property. In other instances, the AAPAD 410 may use other types of received data as confirmation that a user has provided an input. For example, the AAPAD 410 may use the presence of a user within its camera feed to verify that a detected pressure change corresponds to a user input provided by the user. Other types of verification data can include audio data, e.g., spoken input provided by a user, spatial data, e.g., input indicating a proximity to a user, context data, e.g., input indicating that a user is performing an action associated with the interface 412, or location data, e.g., input indicating a present location of a device of the user.

In some implementations, the air pressure module 416 can represent the air pressure module 122 depicted in FIG. 1B. For example, the air pressure module 416 can additionally regulate the air pressure of the balloon, by increasing and/or decreasing the air pressure of the balloon based on the mode of operation of the AAPAD 410, e.g., an active mode or an inactive mode as discussed above.

Although FIG. 4 depicts detected changes in balloon pressure as being used to identify and classify user inputs provided through the interface 402, in some implementations, other types of suitable input detection/classification techniques can also be used by the AAPAD 410. In one example, the balloon of the AAPAD 410 can be made from capacitive material that is capable of detecting touch inputs at specified locations based on detecting touch inputs in a similar manner as touch screens or other types of proximity sensitive displays. In this example, the AAPAD 410 can use electrical signals detected on specified regions of the balloon surface to identify that the user 402 has provided an input. As discussed above, the detected electrical signals can be selectively monitoring during specified time periods so that non-specific touches on the balloon service when the user 402 does not intend to interact with the interface 402 are not detected by the AAPAD 410 as a submitted user input.

In another example, the AAPAD 410 can include an optical sensor placed inside the balloon and configured to monitor the projection area on the balloon surface that corresponds to the interface 412. In this example, balloon can be made of a transparent or translucent material that permits the optical sensor to identify shadows on the projected area that coincide with user interactions on the interface 412. For instance, once a user places a finger on a certain region of the interface 412, the optical sensor can identify the shadow created by the finger and determine that a user has interacted with a user interface element that is rendered on the interface 412.

In some implementations, the AAPAD 410 may use a combination of the input detection techniques discussed above to improve input detection by reducing the number of false positive and/or false negative input detections. For example, the balloon of the AAPAD 410 may be composed of a translucent and capacitive material that permits input detection based on detected electrical signals as well as input detection based on monitoring shadows, as discussed above.

Figure 5:
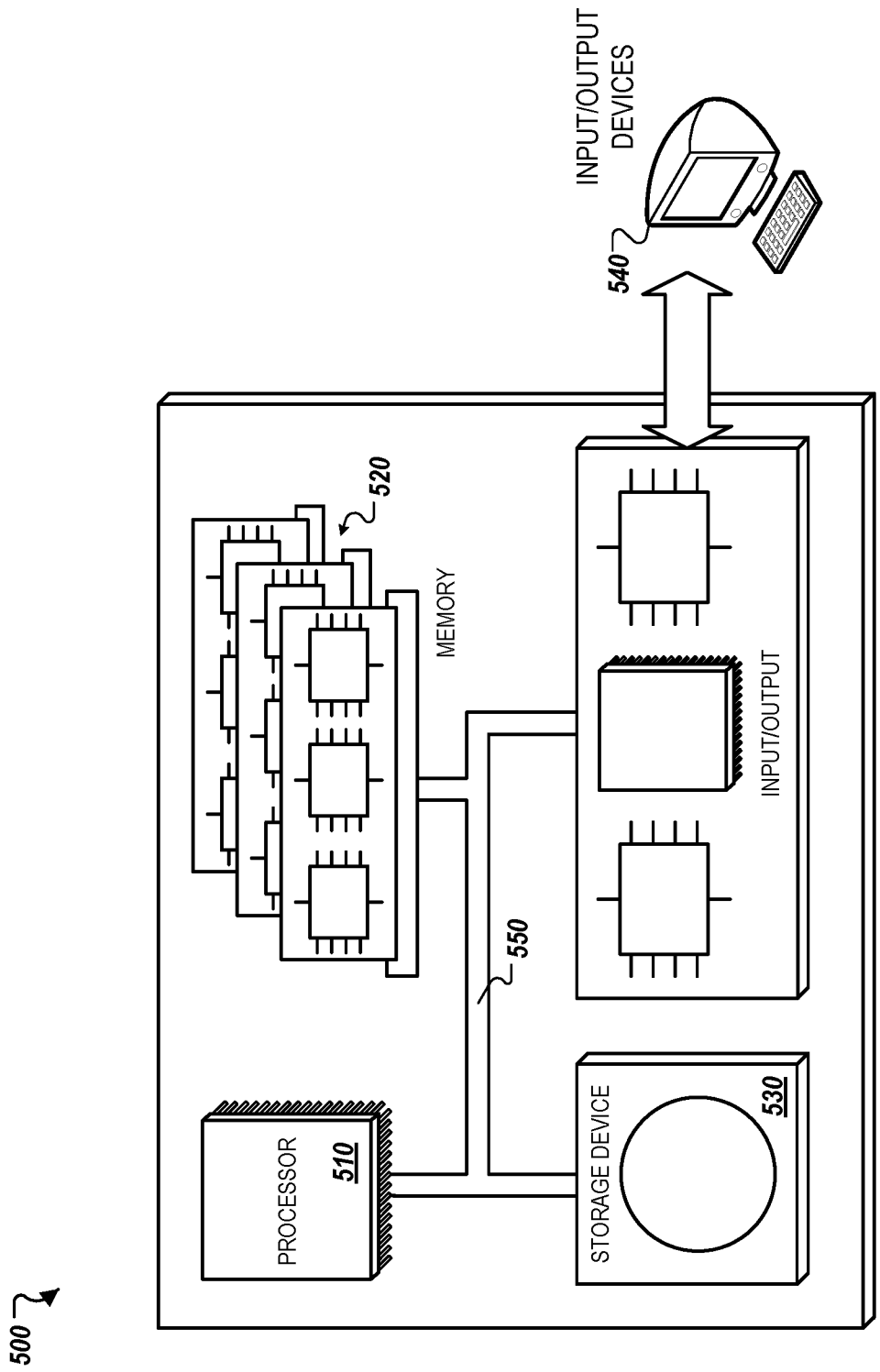
FIG. 5 illustrates a schematic diagram of a computer system that may be applied to any of the computer-implemented methods and other techniques described herein.

FIG. 5 is a schematic diagram of a computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 500) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 540. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An autonomous aerial personal assistant device comprising:
a base unit comprising:
one or more electronic components including a personal assistant component that is configured to detect, and generate responses for, natural language questions,
a rechargeable power generator that provides power to the one or more electronic components,
one or more display elements, one or more cameras, one or more microphones, one or more speakers, and one or more sensors, and
one or more computers comprising:
a natural language processing element configured to process the natural language questions,
a user engagement element that (i) is configured to perform operations comprising determining that a communication session with the user has ended, and in response to determining that the communication session with the user has ended, transmitting instructions to the positioning module to automatically navigate the autonomous aerial personal assistant device to travel in a direction away from a location of the user, and (ii) is configured to:
operate in a first mode in which the autonomous aerial personal assistant remains in a designated location that is not viewable to a user;
operate in a second mode in which the autonomous aerial personal assistant travels along a designated route that tracks movement of the user; or
operate in a third mode in which the autonomous aerial personal assistant, upon receiving an instruction from the user, navigates towards a location of the user;
a balloon for providing lift to carry a weight of the base unit;
a projector that is disposed within the balloon and that is configured to provide representations of the responses to the natural language questions that are detected by the personal assistant component on an interior surface of the balloon for display; and
a positioning unit that maintains a position of the balloon based at least on feedback provided by the one or more sensors and the one or more computers.

2. The device of claim 1, wherein at least one of the one or more sensors is capable of generating a third-dimensional topological representation of a property region within a vicinity of the autonomous aerial personal assistant.

3. The device of claim 1, wherein the user engagement element is configured to perform operations comprising:
identifying a presence of a user within a vicinity of the autonomous aerial personal assistant device based at least on data obtained from the one or more cameras, the one or more sensors, and the one or more computers;
determining a preset distance between the user and the autonomous aerial personal assistant device based at least on the presence of the user; and
transmitting instructions to the positioning module to control movement of the balloon to maintain the preset distance between the user and the autonomous aerial floating personal assistant.

4. The device of claim 3, wherein transmitting instructions to the positioning module to control movement of the balloon to maintain the preset distance comprises transmitting instructions to the positioning module to control movement of the balloon such that the one or more display elements face the user during the movement of the balloon.

5. The device of claim 3, wherein the user engagement element configured to perform further operations comprising:
receiving data indicating a user-specified trajectory of movement; and
transmitting instructions to the positioning module to control movement of the balloon to navigate towards the user-specified trajectory of movement.

6. The device of claim 1, wherein the user engagement element is configured to perform operations comprising:
receiving, from a user device, a request to initiate a communication session on the autonomous aerial personal assistant device; and
in response to receiving a request to initiate a communication on the autonomous aerial personal assistant device, transmitting instructions to the positioning module to automatically navigate the autonomous aerial personal assistant device to travel toward a location of the user.

7. The device of claim 1, wherein the balloon further comprises a refillable helium tank configured to inflate the balloon with helium.

8. The device of claim 1, wherein the one or more computers are configured to perform operations comprising:
receiving, from a remote device associated with a first user, a request to initiate video conference with a second user near a vicinity of the autonomous aerial personal assistant;
identifying a presence of the second user within the vicinity of the autonomous aerial personal assistant device based at least on data obtained from the one or more cameras, the one or more sensors, and the one or more computers; and
in response to identifying the presence of the second user, transmitting instructions to the initiate the video conference between the first user and the second user.

9. A computer-implemented method comprising:
receiving, from a computer device of a user, data indicating a request to initiate a communication session on the autonomous aerial personal assistant device;
obtaining data indicating a presence of the user within a vicinity of the autonomous aerial floating personal assistance device;
determining a preset distance between the user and the autonomous aerial personal assistant device based at least on the obtained data indicating the presence of the user;
transmitting instructions to one or more components of the autonomous aerial floating personal assistance device to:
(i) automatically navigate the autonomous aerial personal assistant device to travel toward a location of the user, and
(ii) control movement of the autonomous aerial floating personal assistance device to maintain the optimal distance between the user and the autonomous aerial floating personal assistant;
in response to a natural language question of the user that is detected by the autonomous aerial personal assistant, automatically, by the autonomous aerial personal assistant, (i) generating a response to the natural language question, and (ii) providing, by a projector that is disposed within a balloon, a representation of the response to the natural language question a representation of the response to the natural language question on an interior surface of the balloon for display to the user; and
determining that the communication session with the user has ended; and
in response to determining that the communication session with the user has ended, transmitting instructions to one or more components of the autonomous aerial personal assistant device to automatically navigate the autonomous aerial personal assistant device to travel in a direction away from a location of the user.

10. The method of claim 9, further comprising:
transmitting instructions to the one or more components of the autonomous aerial floating personal operate in a particular mode from among multiple operation modes, the multiple operation modes including at least:
a first mode in which the autonomous aerial personal assistant remains in a designated location that is not viewable to a user near a vicinity of the autonomous aerial personal assistant;
a second mode in which the autonomous aerial personal assistant travels along a designated route that tracks movement of the user near the vicinity of the autonomous aerial personal assistant; and
a third in which the autonomous aerial personal assistant, upon receiving an instruction from the user near the vicinity of the aerial floating personal assistance device, travels toward a location of the user.

11. The method of claim 9, further comprising:
receiving, from a remote device associated with a first user, a request to initiate video conference with a second user near a vicinity of the autonomous aerial personal assistant;
identifying a presence of the second user within the vicinity of the autonomous aerial personal assistant device based at least on data obtained from one or more cameras, one or more sensors, and one or more computers; and
in response to identifying the presence of the second user, transmitting instructions to the initiate the video conference between the first user and the second user.

12. A non-transitory computer-readable storage device encoded with computer program instructions that, when executed by one or more computers, cause the one or more computers to perform operations comprising:
receiving, from a computer device of a user, data indicating a request to initiate a communication session on the autonomous aerial personal assistant device;
obtaining data indicating a presence of the user within a vicinity of the autonomous aerial floating personal assistance device;
determining a preset distance between the user and the autonomous aerial personal assistant device based at least on the obtained data indicating the presence of the user; transmitting instructions to one or more components of the autonomous aerial floating personal assistance device to:
(i) automatically navigate the autonomous aerial personal assistant device to travel toward a location of the user, and
(ii) control movement of the autonomous aerial floating personal assistance device to maintain the optimal distance between the user and the autonomous aerial floating personal assistant;
in response to a natural language question of the user that is detected by the autonomous aerial personal assistant, automatically, by the autonomous aerial personal assistant, (i) generating a response to the natural language question, and (ii) providing, by a projector that is disposed within a balloon, a representation of the response to the natural language question a representation of the response to the natural language question on an interior surface of the balloon for display to the user; and
determining that the communication session with the user has ended; and
in response to determining that the communication session with the user has ended, transmitting instructions to one or more components of the autonomous aerial personal assistant device to automatically navigate the autonomous aerial personal assistant device to travel in a direction away from a location of the user.

13. The device of claim 12, further comprising:
transmitting instructions to the one or more components of the autonomous aerial floating personal operate in a particular mode from among multiple operation modes, the multiple operation modes including at least:

a first mode in which the autonomous aerial personal assistant remains in a designated location that is not viewable to a user near a vicinity of the autonomous aerial personal assistant;

a second mode in which the autonomous aerial personal assistant travels along a designated route that tracks movement of the user near the vicinity of the autonomous aerial personal assistant; and a third in which the autonomous aerial personal assistant, upon receiving an instruction from the user near the vicinity of the aerial floating personal assistance device, travels toward a location of the user.

14. The device of claim 12, further comprising:

receiving, from a remote device associated with a first user, a request to initiate video conference with a second user near a vicinity of the autonomous aerial personal assistant;

identifying a presence of the second user within the vicinity of the autonomous aerial personal assistant device based at least on data obtained from one or more cameras, one or more sensors, and one or more computers; and in response to identifying the presence of the second user, transmitting instructions to the initiate the video conference between the first user and the second user.

* * * * *